United States Patent
Stephenson et al.

(10) Patent No.: US 8,412,755 B2
(45) Date of Patent: Apr. 2, 2013

(54) PERMUTING RECORDS IN A DATABASE FOR LEAK DETECTION AND TRACING

(75) Inventors: Bryan Stephenson, Alviso, CA (US); Ersin Uzun, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 743 days.

(21) Appl. No.: 12/490,091

(22) Filed: Jun. 23, 2009

(65) Prior Publication Data

US 2010/0325095 A1 Dec. 23, 2010

(51) Int. Cl.
G06F 17/00 (2006.01)
G06F 17/30 (2006.01)

(52) U.S. Cl. ............... 707/899; 705/51; 709/229

(58) Field of Classification Search .......... 707/687, 707/999.101, 899; 705/51; 709/229; 382/305
See application file for complete search history.

(56) References Cited

U.S. PATENT DOCUMENTS

| | | | |
|---|---|---|---|
| 6,574,732 B1 | 6/2003 | Steinberg et al. | |
| 7,047,422 B2 * | 5/2006 | Benaloh | 713/193 |
| 7,200,757 B1 * | 4/2007 | Muralidhar et al. | 713/189 |
| 7,424,130 B2 * | 9/2008 | Kondo et al. | 382/100 |
| 7,555,489 B2 * | 6/2009 | Bell et al. | 1/1 |
| 7,730,037 B2 * | 6/2010 | Jajodia et al. | 707/687 |
| 8,023,773 B2 * | 9/2011 | Brunk et al. | 382/305 |
| 2006/0294092 A1 * | 12/2006 | Giang et al. | 707/5 |
| 2009/0006431 A1 * | 1/2009 | Agrawal et al. | 707/100 |
| 2010/0005048 A1 * | 1/2010 | Bodapati et al. | 706/47 |
| 2010/0186067 A1 * | 7/2010 | Stephenson et al. | 726/4 |
| 2010/0205189 A1 * | 8/2010 | Ebrahimi et al. | 707/757 |

OTHER PUBLICATIONS

Wolfram MathWorld, "Hash Function", Sep. 19, 2008, available online: http://web.archive.org/web/20080920022818/http://mathworld.wolfram.com/HashFunction.html.*
R Moore, Jr., "Controlled Data-Swapping Techniques for Masking Public Use Microdata", 1996.*
Elisa Bertino et al, "Privacy and Ownership Preserving of Outsourced Medical Data", 2005, Data Engineering.*
Rakesh Agrawal et al, "Privacy-Preserving Data Mining", 2000.*
R. Venkatesan et al., "A Graph Theoretic Approach to Software Watermarking," Mar. 23, 2000, 9 p.
M. Topkara et al., "Natural Language Watermarking: Challenges in Building a Practical System," 12 p.
M. Atallah et al., "Natural Language Watermarking and Tamperproofing," F.A.P. Petitcolas (Ed): IH 2002, LNCS 2578, pp. 196-212, 2003, 17 p.
R. Sion et al., "Rights Protection for Relational Data," IEEE Transactions on Knowledge and Data Engineering, vol. 16, No. 12, Dec. 2004, 1509-1525, 17 p.
R. Sion, "Proving Ownership over Categorical Data," Proceedings of the 20th International Conference on Data Engineering (ICDE '04), 12 p.
S. Liu et al., "A Block Oriented Fingerprinting Scheme in Relational Database," ICISC 2004, LNCS 3506, pp. 455-466, 2005, 12 p.

(Continued)

*Primary Examiner* — Brannon W Smith

(57) ABSTRACT

A method comprises receiving, by a processor, a copy of a database containing records, each record having a plurality of attributes. The method also comprises determining, by the processor, whether a first attribute in each record results in a predetermined value in modulo P when hashed with a key and determining, by the processor, whether a second attribute in each record results in the predetermined value in modulo P when hashed with a key. For a first record whose first attribute results in the predetermined value in modulo P when hashed with a key and a second record whose second attribute also results in the predetermined value in modulo P when hashed with a key, the method further comprises swapping by the processor the second attributes between the first and second records.

18 Claims, 4 Drawing Sheets

| | NAME | AC | PH NUMBER | ADDRESS | EMAIL |
|---|---|---|---|---|---|
| 1 | | | | | |
| 2 | | | | | |
| 3 | | | | | |
| 4 | JOE SMITH | 555 | 246-1234 | 123 ELM ST. | JOE.SMITH@WORK1.COM |
| 5 | | | | | |
| 6 | AMY BAKER | 800 | 123-4567 | 567 MAIN ST. | AMY.BAKER@WORK.COM |
| 7 | | | | | |
| 8 | | | | | |
| 9 | | | | | |
| 10 | | | | | |

OTHER PUBLICATIONS

Y. Li et al., "Fingerprinting Relational Databases: Schemes and Specialties," IEEE Transactions on Dependable and Secure Computing, vol. 2, No. 1, Jan.-Mar. 2005, 12 p.

N. Johnson et al., "Information Hiding: Steganography and Watermarking—Attacks and Countermeasures," Book Reviews, Journal of Electronic Imaging, Jul. 2001, vol. 10(3), 825, 2 p.

M. Huang et al., "A New Watermark Mechanism for Relational Data," pp. 946-950, Copyright 2004 IEEE, 5 p.

F. Guo et al., "An Improved Algorithm to Watermark Numeric Relational Data," WISA 2005, LNCS 3786, pp. 138-149, 2006, 12 p.

D. Gross-Amblard, "Query-preserving Watermarking of Relational Databases and XML Documents," PODS 2003, Jun. 9-12, 2003, pp. 191-201, 11 p.

K. Fukushima et al., "A Software Fingerprinting Scheme for Java Using Classfiles Obfuscation," WISA 2003, LNCS 2908, pp. 303-316, 2004, 14 p.

I. Cox et al., "Digital Watermarking," Book Reviews, 414 Journal of Electronic Imaging, Jul. 2002, vol. 11(3), 1 p.

R. Agrawal et al., "A System for Watermarking Relational Databases," SIGMOD 2003, Jun. 9-12, 2003, San Diego, California, Copyright 2003 ACM, 1 p.

R. Agrawal et al., "Watermarking Relational Databases," 12 p.

R. Agrawal et al., "Watermarking relational data: framework, algorithms and analysis," The VLDB Journal (2003) / Digital Object Identifier (DOI), Edited by P. Bernstein. / Accepted: Dec. 10, 2002, 13 p.

C. Collberg et al., "Software Watermarking: Models and Dynamic Embeddings," 2 p. [Online] http://www.cs.arizona.edu/~collberg/Research/Publications/CollbergTh. . . .

C. Collberg et al., "Dynamic Path-Based Software Watermarking," 10 p.

I. J. Cox et al., "Secure Spread Spectrum Watermarking for Multimedia," Published in IEEE Trans. on Image Processing, 6, 12, 1673-1687, (1997) Copyright IEEE, 31 p.

R. Sion et al., "Rights Protection for Relational Data and Sensor Streams," Cerias, Purdue University, 1 p.

S. Katzenbeisser et al., "Information Hiding Techniques for Steganography and Digital Watermarking," A Survey of Current Watermarking Techniques, Copyright 2000 Artech House Inc., 6 p.

M. Topkara et al., "Natural Language Watermarking," 12 p.

USPS, "Address Verification," United States Postal System, 3 p. [Online] http://www.usps.com/business/addressverification/welcome.htm.

Y. Zhang et al., "A Method of Protecting Relational Databases Copyright with Cloud Watermark," Proceedings of World Academy of Science, Engineering and Technology vol. 3 Jan. 2005, 5 p.

\* cited by examiner

|   | NAME | AC | PH NUMBER | ADDRESS | EMAIL |
|---|------|----|-----------|---------|-------|
| 1 |      |    |           |         |       |
| 2 |      |    |           |         |       |
| 3 |      |    |           |         |       |
| 4 | JOE SMITH | 555 | 246-1234 | 123 ELM ST. | JOE.SMITH@WORK1.COM |
| 5 |      |    |           |         |       |
| 6 | AMY BAKER | 800 | 123-4567 | 567 MAIN ST. | AMY.BAKER@WORK.COM |
| 7 |      |    |           |         |       |
| 8 |      |    |           |         |       |
| 9 |      |    |           |         |       |
| 10|      |    |           |         |       |

FIG. 2

PERMUTING RECORDS IN A DATABASE FOR LEAK DETECTION AND TRACING

BACKGROUND

Demanding market conditions are such that some companies outsource certain business processes and associated activities to third parties. Maintaining proper confidentiality of business-critical data is a significant concern for this approach. In many cases, third-party service providers need access to such information as the company's intellectual property, client/customer data, or other confidential information to carry out their services. However, a service provider may not be fully trusted or may not be securely administered. Furthermore, it can be difficult or nearly impossible to enforce confidentiality policies across different administrative domains. Some types of data (e.g., relational databases) are particularly easy to duplicate, and an unscrupulous service provider may have a financial incentive to redistribute commercially valuable data to unauthorized parties.

BRIEF DESCRIPTION OF THE DRAWINGS

For a detailed description of exemplary embodiments of the invention, reference will now be made to the accompanying drawings in which:

FIG. 2 illustrates swapping of attributes among records in accordance with various embodiments;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
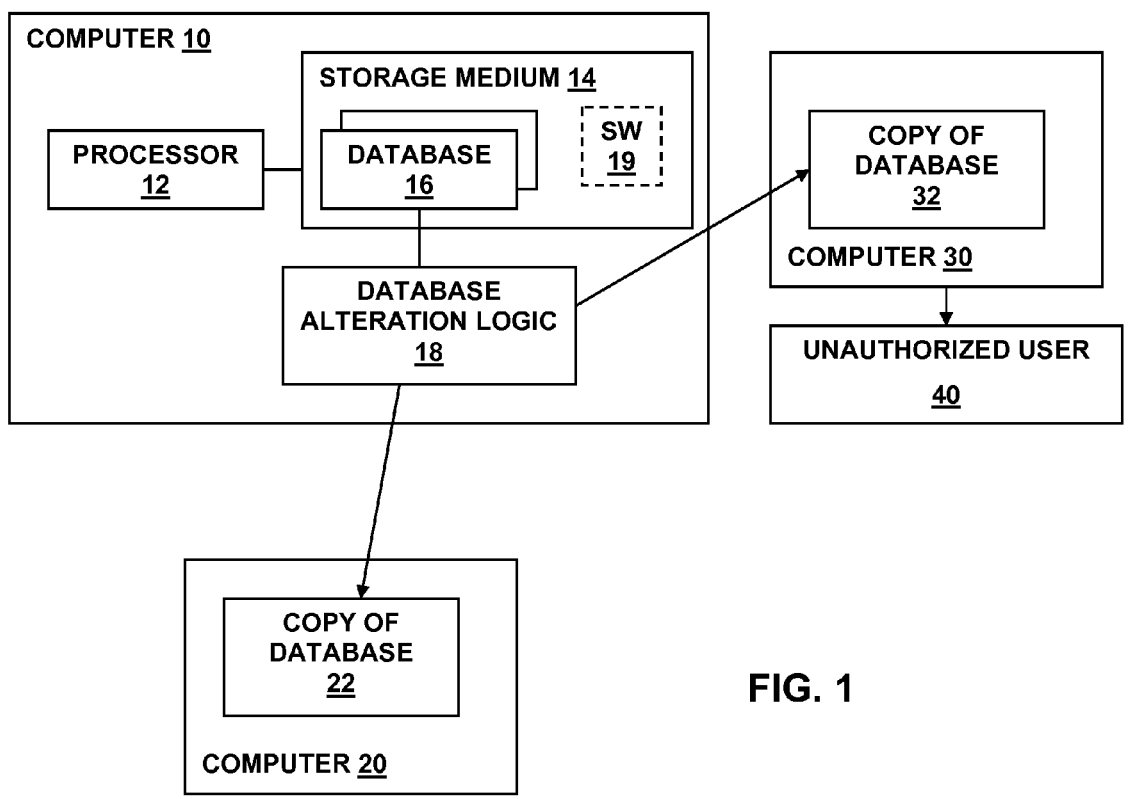
FIG. 1 shows a system in accordance with various embodiments.

FIG. 1 shows a system in accordance with various embodiments. The system comprises computers 10, 20, and 30 which may be implemented as servers or other types of computers. Computer 10 comprises a processor 12 coupled to a computer-readable storage medium 14. The storage medium 14 comprises volatile storage (e.g., random access memory), non-volatile storage (e.g., hard disk drive, read only memory, compact disc read only memory, Flash storage, etc.), or combinations thereof. The storage 14 may be contained within the computer 10. In other embodiments, the storage 14 is separate from, but accessible to, the computer 10 (e.g., a network-attached storage device).

The storage medium 14 contains one or more databases 16. Each database 16 may contain whatever information is desired for the database to contain. In accordance with one example, the database 16 is a relational database and includes a plurality of records and each record includes any one or more of various data fields such as name, address, telephone number, etc. In accordance with other examples, the database is a text file containing data. In accordance with yet other examples, the database is a spreadsheet file containing data. The disclosed technique is applicable to any structure of data which includes records or rows, where the records or rows contain attributes. The term "database" encompasses all such data structures.

The computer 10 on which the database 16 is stored is owned and/or operated by an entity such as an organization (e.g., a company) or an individual. The owner of the database 16 may desire to provide a copy of the database to one or more other entities such as for a marketing campaign. The owner of the database, however, does not want the recipient of the copy of the database to provide additional copies of the database to others. Embodiments of this disclosure provide a way to detect that a legitimate database recipient (i.e., someone or some organization to whom the owner gave a copy of the database) has leaked a copy of the database without permission from the owner. The database is "marked" in such a way that the unauthorized leak of the database can be detected and traced back to the source of the leak. The marking procedure described below can be performed by the database owner itself or by a service supplier to whom the owner transfers the database for marking. The computer 10 is described below as performing the marking, and computer 10 may belong to the database owner or to a supplier. In some embodiments, the database is marked in such a way that, to the extent multiple recipients received copies of the database, it can be determined which of the recipients leaked the database. That is, the leak can be traced back to a particular database recipient.

Referring still to FIG. 1, the computer 10 comprises database alteration logic 18. Database alteration logic 18 may comprise hardware or software (e.g., software 19) executed by processor 12. As software, the database alteration logic 18 is stored on storage medium 14. The database alteration logic 18 alters the database 16 in such a way that an unauthorized leak of the database can be detected.

In accordance with at least some embodiments, the database alteration logic 18 alters the database 16 by permuting one or more attributes between two or more of the database's records in such a way that a predetermined property of the database changes. The permutation can be unique to each intended recipient of the database. Consequently, examining a database for that property indicates whether that database has been marked. Thus, if a copy of the database has been discovered and suspected to have been leaked, that copy can be analyzed for the predetermined property. If the property is found in the database, the leak can be traced back to a particular initial recipient as being a likely culprit to have leaked the database.

Permuting one or more attributes between records in a database changes the records and thus makes the records inaccurate. However, it is often the case that, for various reasons, such as human data entry error, one or more of the records in a database are erroneous anyway. The number of additional records to be intentionally altered in accordance with the various embodiments is generally a small percentage of the number of records that are already in error. For example, a database of 100,000 records might have 5000 records with errors. The technique described herein may result in an additional 250 (by way of example) records being marked (altered) thereby resulting in a relatively small increase in the total number of records with erroneous data. The increase in the number of records with errors may be considered to be a worthwhile tradeoff given the benefit provided by the disclosed marking technique—the ability to trace a leak of a database.

FIG. 2 shows an exemplary database of names, area codes, phone numbers, email addresses, and addresses. In the example database of FIG. 2, there are 10 records, numbered "1" through "10." In general, the database may have any number of records and each record may have any number and type of constituent elements. For purposes of this disclosure, the constituent elements of a record are referred to as "attributes." Each of the 10 records in the database of FIG. 2 has five attributes—name, area code, phone number, address, and email address. The example of FIG. 2 illustrates the attributes for two of the records. One record is for Joe Smith whose area code, phone number, address, and email address are 555, 246-1234, 123 Elm St., and Joe.Smith@work1.com, respectively. The other record is for Amy Baker whose attributes are area code 800, phone number 123-4567, address 567 Main St., and email address Amy.Baker@work.com.

In accordance with various embodiments, corresponding attributes between two or more records are swapped. For example, Joe Smith's area code may be swapped with Amy Baker's area code. The technique described below is used to determine which records to select for permutation of attributes in accordance with at least some embodiments.

The disclosed technique uses a keyed hash function. A hash function is a function that produces an output value based on an input value. A keyed hash function concatenates a key with the input data. A different key can be used for each database recipient. Further, there is little, if any, correlation between the input and output values and thus it is very difficult, if not impossible, to determine the hash function or the key based on an examination of the input and output values.

Figure 3:
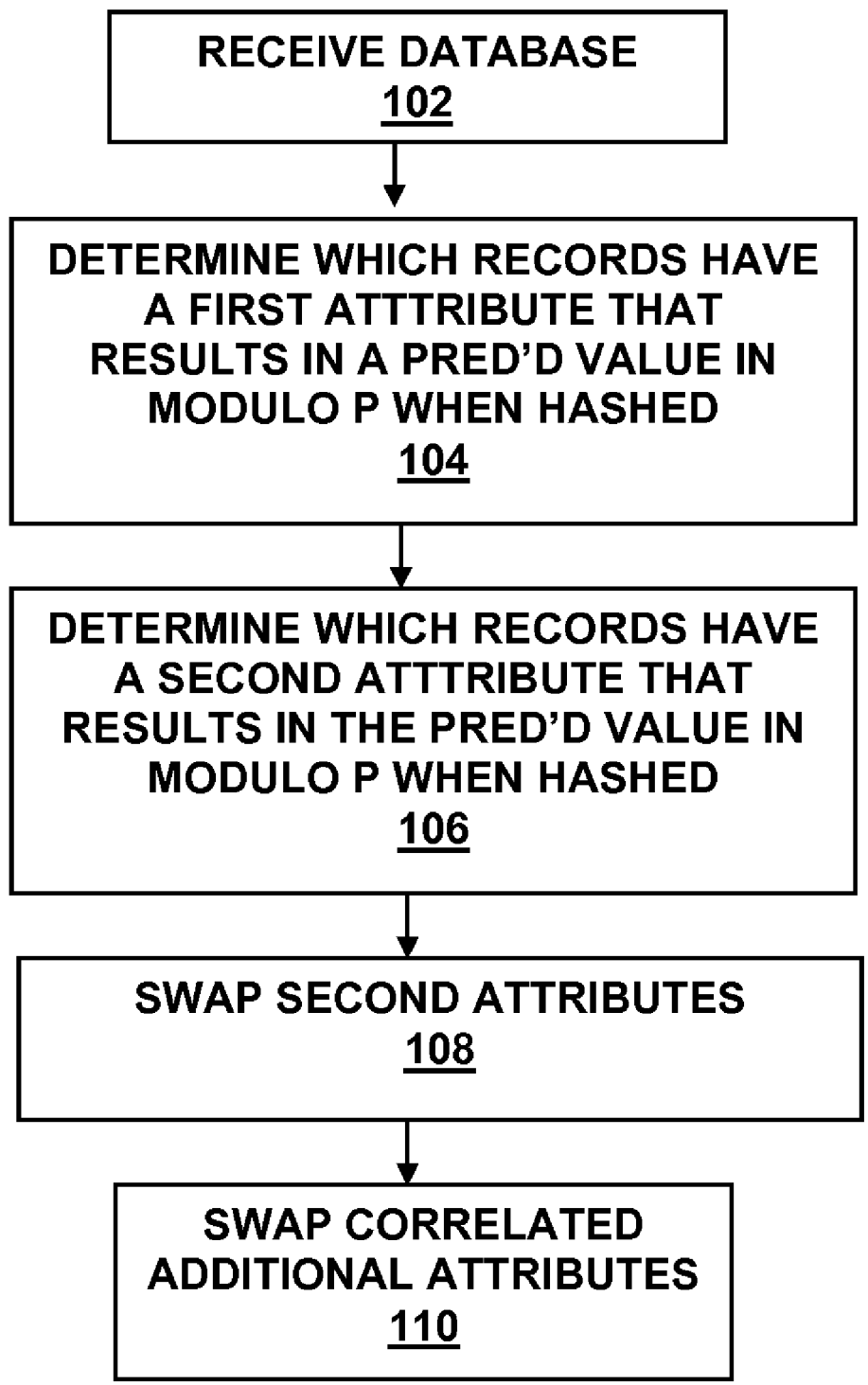
FIG. 3 shows a method of marking a database in accordance with various embodiments.

A technique in accordance with at least one embodiment for marking the database is illustrated in FIG. 3. The steps of the method of FIG. 3 may be performed by the processor 12 of FIG. 1 executing software stored on the storage medium 14. The steps of FIG. 3 may be performed in the order shown, or in a different order, and some of the steps may be performed concurrently (i.e., in parallel).

At 102, the method comprises receiving a copy of a database to be marked. This step may be accomplished by the processor 12 retrieving a copy of the database from a storage medium, such as storage medium 14, or by downloading a copy of the database from another computer or storage device.

At 104, the method comprises determining which records have a first attribute that results in a predetermined value in modulo P when hashed with a key. This step comprises evaluating each record in the database. For each record, the key is concatenated with a first attribute and the result is hashed (input into a suitable hash function). The first attribute can be any of the attributes in the records. For step 104, the same attribute is hashed in each record. By way of an example, the first attribute may be the name attribute. In the example of FIG. 2, the name "Joe Smith" is concatenated with the key and hashed as well as the name "Amy Baker." The resulting value of hashing the key with the first attribute (name) is referred to as a "hash value." Step 104 comprises determining whether, for each record, the hash value in modulo P is a predetermined value. In some embodiments, the predetermined value is 0, but can be other than 0. Accordingly, for step 104, the first attribute in each record is hashed and then the resulting value of the hash is divided by P to determine the remainder. Step 104 determines if the remainder is a certain predetermined value (e.g., 0). This process is repeated for all records to identify those records whose first attribute has this property.

In general, there is a probability p that a first attribute for a given record will result in the predetermined value in modulo P when hashed. The relationship between p and P is p=1/P. For example, assume the modulo value P is 50. This means there is a 1/50 or 2% probability that a given record in the database will have its first attribute (e.g., name) result in the predetermined value 50 when hashed with a key.

Step 106 in the method of FIG. 3 is similar to step 104, but a different attribute is selected for hashing for each record. For example, the area code attribute may be selected as the second attribute. Accordingly, for each record in the database, the method determines whether the second attribute (e.g., area code) results in a predetermined value (e.g., 0) in modulo P when hashed using the same hash function. The predetermined value used in step 106 may be the same as or different than the predetermined value used in step 104. The probability is also p that a second attribute for a given record will result in the predetermined value in modulo P when hashed with a key.

The probability that a given record will have the property that both of its first and second attributes (e.g., name and area code) will result in a predetermined value in modulo P when hashed with a key is $1/(P^2)$ (also designated as 1/(P^2) where the ^ symbol means "raised to the power").

Referring still to FIG. 3, in step 108, second attributes are swapped between records in which, for one of the records, the first attribute results in the predetermined value used in step 104 in modulo P when hashed with a key and, for the other record, the second attribute results in the predetermined value used in step 106 in modulo P when hashed with a key. By swapping the second attributes between these records, at least one of the records will have first and second attributes that have the property that both attributes result in the predetermined value in modulo P when hashed with a key. As more and more records are permuted in this manner, the number of records in the altered database that will have both first and second attributes resulting in the predetermined value in modulo P when hashed with a key will increase. In accordance with various embodiments, most or all pairs of records (for which the properties of the first and second attributes between the record pairs are true) are permuted in this manner. In an unmarked database, the expected ratio is approximately $1/(P^2)$ for records with both the first and second attributes resulting in the predetermined value in modulo P compared to the total number of records in the database. In other words, the ratio of records with this property to the total number of records in the database is expected to be approximately $1/P^2$). For a marked database, however, the ratio of records with this property to the total number of records increases substantially to, for example, 1/P.

In general, there may be multiple records whose first attribute has the property described above and there will be multiple records whose second attribute has the property. A distance function is applied to help determine those records having the property for the first/second attributes for which the swap is to occur. In this context, a distance function is a function which determines how close two values are. In some embodiments, a distance function operates on the set of real numbers to determine which numbers are closest in value and thus be swapped. Such a distance function will help to minimize the error introduced by the permutation. For example, if the second attribute comprises temperature values, then temperatures closer in value should be chosen if possible. If three temperature values 70, 15, and 69 in three different records are candidates for permuting (swapping), the temperature values 70 and 69 should be swapped instead of 15.

The second attribute to be swapped among pairs of records may be somewhat correlated with yet a third attribute, or even more attributes. For example, email address and names are usually fairly well correlated. In the exemplary database of FIG. 2, Joe Smith's email address (joe.smith@work1.com) bears some relationship to his name, Joe Smith. If the second attribute is the email address and Joe and Amy's email addresses were swapped, then Joe Smith's record would have Amy Baker's email address and vice versa. Permuting records in this manner may be detectable by an unauthorized person trying to figure out the permutations, for example, to swap the attributes back to their original form to remove the mark. Instead of just swapping the email addresses, the name attributes may also be swapped. In general, some embodiments include swapping the second attribute and any other attribute that is considered somewhat correlated to the second attribute. Some embodiments attempt to choose an attribute with few or no correlations to other attributes.

As noted above, more than one copy of a database may be given to multiple recipients. In accordance with various embodiments, each such database copy is marked as described above, but using a different key as the additional input to the hash function. The different key will (almost always) result in a different set of records with first and second attributes resulting in the same predetermined value (e.g., 0) in modulo P when hashed with that key using the same hash function. Computer 10 stores information which specifies which key was used to mark a database copy given to a particular recipient, to trace which recipient may have leaked a copy of a marked database.

After marking the copies of the database in this manner, the database copies are distributed to recipients such as to computers 20 or 30. Without permission of the database owner, one or more of the recipients may further distribute (e.g., sell) their copy of the database to an unauthorized third party(ies). If the database owner discovers a partial or complete copy of the database on, for example, a network, and suspects that copy to have been improperly distributed, a computer owned or operated by the database owner or someone else can analyze the database copy to determine if it had been marked, and if so, which recipient's mark is contained in the leaked copy.

Figure 4:
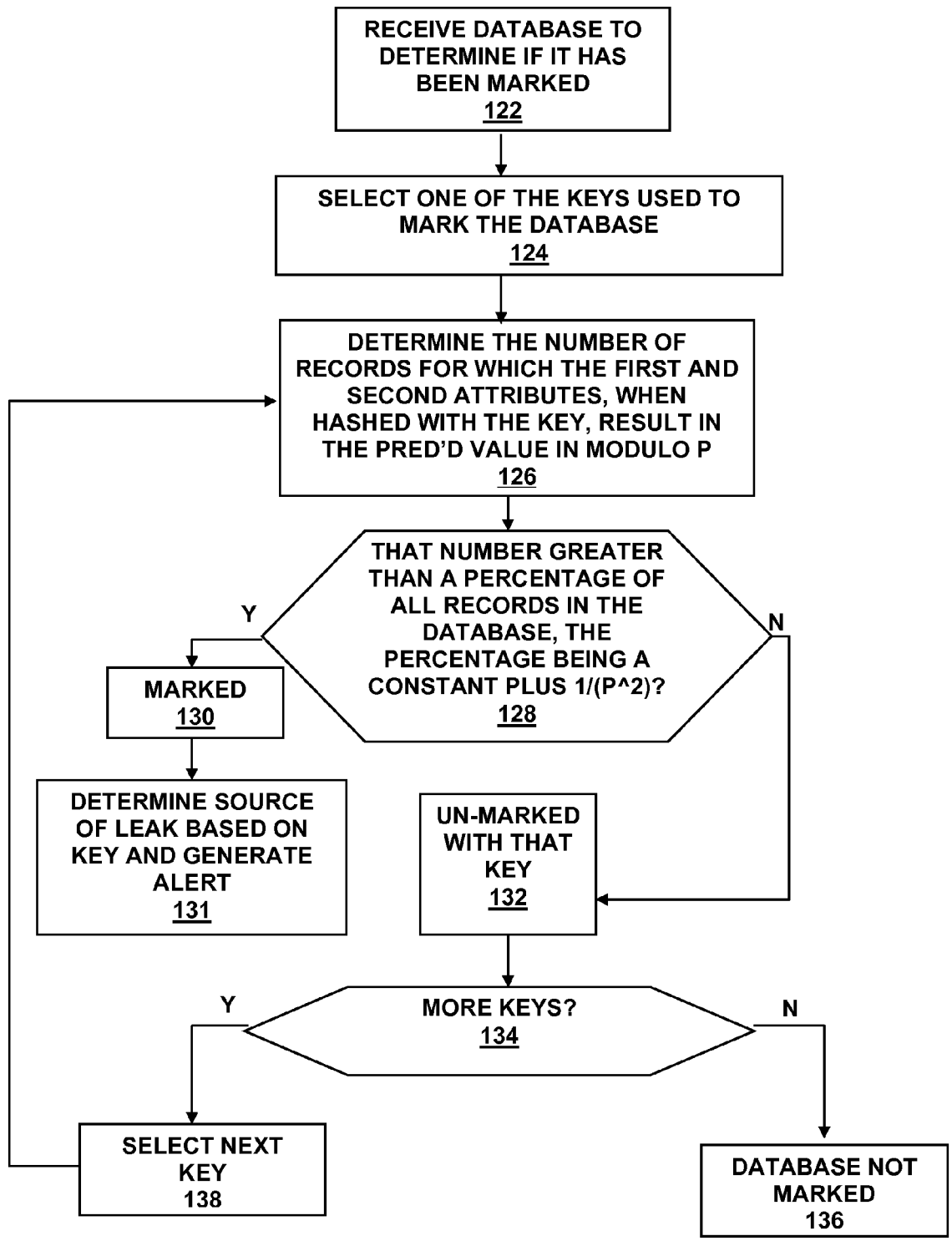
FIG. 4 shows a method of determining whether a database has been marked in accordance with various embodiments.

FIG. 4 illustrates a method for analyzing a copy of a database to determine if the copy is marked in accordance with the technique noted above. This method may be performed by, for example, processor 12 of computer 10 executing software stored in storage medium 14. A copy of the suspect database copy is received at 122 (e.g., downloading or retrieval from storage).

As multiple copies of the database may have been marked, the method comprises selecting one of the keys that were used to mark a copy of the database in the first place. The software that performs the detection algorithm is aware of which keys were used during the marking phase of each database copy. At 126, the method comprises determining the number of records in the copy of the database being analyzed for which the first and second attributes both result in the predetermined value (e.g., 0) in modulo P when hashed with the key. It is to be expected that, for an unmarked database, this number will be approximately $1/(P^2)$ of the total records in the database. If, however, that number is significantly higher (e.g., 1/P of the total records), then it is determined that the database has been marked using the same key. Decision step 128 determines whether the number of records with the property noted above for both first and second attributes is greater than a certain percentage of the records in the database. In some embodiments, that particular percentage is a constant value plus $1/(P^2)$. Lower values may still be indicative of marked databases. The constant value can be preset or programmed. The result of decision 128 is that the database is determined to have been marked (130) or not to have been marked (132) with that particular key. If the percentage of records with the target property is not greater than the constant value plus $1/(P^2)$, then the database is determined not to have been marked using that particular key.

If the database is determined to have been marked, then it is known which key was used to mark the database, and that information then can be used to trace the leak to the particular recipient (step 131). An alert can then be generated by the computer. The alert may comprise a message being sent to a person, a visual alert, an audible alert, etc. If the database is not determined to have been marked based on the particular key selected in step 124, then, if other keys were used during the marking phase (decision step 134), another key is selected at 138 and the process repeats. The process will repeat for additional keys until a key is discovered to have been the key used to mark the database copy at hand, or no more keys were used to mark the database. In this latter situation, the method determines at 136 that the database copy has not been marked at all, and thus none of the recipients likely leaked the database copy.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a processor, a copy of a database containing records, each record having a plurality of attributes;
determining, by the processor, which records have a first attribute that results in a predetermined value in modulo P when hashed with a key; and
determining, by the processor, which records have a second attribute that results in a predetermined value in modulo P when hashed with a key;
for at least a first record whose first attribute results in the predetermined value in modulo P when hashed with a key and at least a second record whose second attribute also results in the predetermined value in modulo P when hashed with a key, swapping by the processor said second attributes between the first and second records; and
wherein a plurality of records have a second attribute that results in the predetermined value in modulo P when hashed with a key, and the method further comprises applying, by the processor, a distance function to help determine which of such second records to select as the second record for swapping the second attributes.

2. The method of claim 1 further comprising swapping second attributes between a plurality of pairs of records wherein for each pair, one record of said pair comprises a first attribute that results in said predetermined value in modulo P when hashed with a key and the other record of said pair comprises a second attribute that results in said predetermined value in modulo P when hashed with a key.

3. The method of claim 1 further comprising swapping between the first and second records a third attribute along with the second attribute.

4. The method of claim 3 wherein said third and second attributes are correlated.

5. The method of claim 1 further comprising determining the number of records in the database in which, for each such record, both the first and second attributes, when hashed with a key, result in said predetermined value in modulo P.

6. The method of claim 5 further comprising determining if said number of records is greater than the number of records which is a percentage of all of the records in the database.

7. The method of claim 6 wherein the percentage is a constant plus $1/(P^2)$.

8. A non-transitory computer-readable storage medium (CRSM) containing software that, when executed by a processor, causes the processor to:
receive a copy of a database containing records, each record having a plurality of attributes;
determine whether a first attribute in each record results in a predetermined value in modulo P when hashed with a key; and
determine whether a second attribute in each record results in a predetermined value in modulo P when hashed with a key;
for a first record whose first attribute results in the predetermined value in modulo P when hashed with a key and a second record whose second attribute also results in the predetermined value in modulo P when hashed with a key, swap said second attributes between the first and second records; and
wherein a plurality of records have a second attribute that results in the predetermined value in modulo P when hashed with a key, and the software further causes the processor to apply a distance function to help determine which of such records to select as the second record for swapping the second attributes.

9. The non-transitory CRSM of claim 8 further comprising the software causing the processor to swap a third attribute along with the second attribute between the first and second records.

10. The non-transitory CRSM of claim 9 wherein said third and second attributes are correlated.

11. The non-transitory CRSM of claim 8 wherein said software swaps second attributes between a plurality of pairs of records wherein for each pair, one record of said pair comprises a first attribute that results in said predetermined value in modulo P when hashed with a key and the other record of said pair comprises a second attribute that results in said predetermined value in modulo P when hashed with a key.

12. The non-transitory CRSM of claim 8 wherein said software further comprises determining the number of records in the database in which, for each such record, both the first and second attributes, when hashed with a key, result in said predetermined value in modulo P.

13. The non-transitory CRSM of claim 12 wherein said software further comprises determining if said number of records is greater than the number of records which is a percentage of all of the records in the database.

14. The non-transitory CRSM of claim 13 wherein the percentage is a constant plus $1/(P^2)$.

15. A method, comprising:
receiving, by a processor, a copy of a database containing records, each record having a plurality of attributes;
selecting two attributes to be a first attribute and a second attribute;
determining, by the processor, the number of records that have the first attribute and the second attribute that each results in a predetermined value in modulo P when hashed with a key; and
determining, by the processor, whether the number is greater than a threshold;
determining, by the processor, the database copy to have been marked using the key and the first and second attributes if the number is greater than the threshold, a database copy having been marked through application of a distance function to determine which of the records to select for swapping; and
determining, by the processor, the database copy not to have been marked using the key if the number is less than the threshold.

16. The method of claim 15 further comprising determining, by the processor, which of a plurality of database recipients leaked the database copy based on the key.

17. The method of claim 15 further comprising selecting a different key and repeating each of the determining steps using such different key.

18. The method of claim 15 wherein the threshold is a constant value plus $1/(P^2)$.

* * * * *